Patented May 8, 1928.

1,669,393

UNITED STATES PATENT OFFICE.

ANTON DEMBOWICK, OF MINNEAPOLIS, MINNESOTA.

BATTERY SOLUTION.

No Drawing.  Application filed August 4, 1926.  Serial No. 127,184.

This invention relates to battery solutions or fluids and has for an object the production of a battery fluid which may be employed in automobile batteries, farm lighting batteries and the like; and it also has for an object the provision of a solution which does not evaporate rapidly and in which its active principles are prolonged, as compared with battery solutions now in common use.

It is a further object of this invention to produce a battery solution which does not deteriorate when stored, practically regardless of temperature changes and conditions.

It is a still further object to produce a battery fluid which is comparatively inexpensive.

With the foregoing and other objects in view, the invention consists in the elements hereinafter set forth and specifically in their proportions and method of producing or compounding the solution.

In carrying the invention into practice and as one example of the resultant product, sulphuric acid; water; powdered alum; Epsom salts; bisulfate of ammonia; bisulfate of mercury and glycerine are employed, and preferably in the proportions in accordance with the following tabulation, viz:

| | Parts. |
|---|---|
| 1835 sulphuric acid | 82.5 |
| Water | 75.5 |
| Powdered alum | 1 |
| Epsom salts | 1 |
| Bisulfate of ammonia | 1 |
| Bisulfate of mercury | 1 |
| Glycerine | 0.25 |

In compounding the ingredients to produce the solution and as an alternative expression of the proportion of parts, 5 gallons of 1835 sulphuric acid is commingled by agitation with 10 gallons of water, and a suitable receptacle for receiving the ingredients has been found to be a crock of 15 gallon capacity. When the sulphuric acid and water are commingled, the temperature will rise to about 120° F. and during this time the commingled ingredients should be stirred well, and one pound of alum, one pound of Epsom salts and one pound of bisulfate of ammonia should be added and thoroughly commingled. One-quarter pound of bisulfate of mercury should afterwards be added and commingled with the other ingredients and the resultant solution should be permitted to cool. In the next step of the process, water is added to bring the mixture to specific gravity of 1300 and one pound of glycerine added and commingled with the solution, the agitation of the commingled ingredients being continued until gassing ceases and the temperature should be brought to 90° F.

It has been found in practice that for automobile batteries the solution is best adapted for use when the specific gravity is 1300, but for farm lighting batteries and batteries that are not agitated or moved to any appreciable extent, the specific gravity of 1250 gives the best results.

The proportions mentioned in connection with a description of the compounding of the ingredients corresponds to the proportions by parts as tabulated, and as set forth the proportions have been found to give the best results in practice.

I claim:

1. The herein described battery solution consisting in 1835 sulphuric acid 82.5 parts; water 75.5 parts; powdered alum 1 part; Epsom salts 1 part; bisulfate of ammonia 1 part; bisulfate of mercury 1 part; and glycerine 0.25 part.

2. The herein described battery solution consisting of sulphuric acid diluted with approximately its volume of water and comparatively small quantities of alum, Epsom salts, bisulphate of ammonia, bisulphate of mercury and glycerine.

ANTON DEMBOWICK.